3,232,773
REFRACTORY SHAPES
Dwight S. Whittemore and David C. Hanson, Pittsburgh, Pa., assignors to Harbison-Walker Refractories Company, Pittsburgh, Pa., a corporation of Pennsylvania
No Drawing. Filed Jan. 28, 1964, Ser. No. 340,803
7 Claims. (Cl. 106—57)

The present invention relates to refractory materials, to refractory shapes manufactured therefrom and to a method of preparing certain refractory shapes. More particularly, the invention relates to the production of refractory shapes from specially size graded, stabilized zirconia refractory materials, having relatively high density.

In copending application, Serial No. 259,461, filed February 18, 1963, and entitled "Refractory Structure and Shapes Therefor," now U.S. Patent No. 3,199,994, there is disclosed novel size graded batches of refractories which are extraordinarily useful for the fabrication of refractory shapes having excellent intermediate and high temperature strength, high density and low porosity, require relatively low burning temperatures and have other desirable physical properties. The preparation of these refractory batches is such that they are generally characterized by the presence of a rather large quantity of fines; as much as 30%, by weight, of the batch being fines which will pass through a 325 mesh screen. As is clearly set forth in said copending application, the particularly size graded refractory materials to which that application is directed may be formed into shapes on such as an impact press to provide a product having properties significantly superior to those capable of being formed, for example, on a conventional power press.

It has now been discovered that improved, relatively high density stabilized zirconia brick may be produced by impact pressing a batch of somewhat differently but still specially size graded stabilized zirconia material.

Accordingly, it is an object of this invention to provide improved methods of manufacturing stabilized zirconia refractory shapes.

It is another object of the invention to provide improved stabilized zirconia refractory shapes.

It is another object of this invention to provide improved stabilized zirconia refractory batches, for fabrication of burned refractories having relatively high density.

Briefly, according to one aspect of this invention, there is provided a method of fabricating fired refractory shapes of high density from size graded refractory brickmaking batches of stabilized zirconia. By "high density," it is meant a burned density of at least about 250 and up to 275 p.c.f. The zirconia is sized so that all of it passes a 4 mesh screen (—4 mesh) and from 35 to 50%, by weight, rests on a 10 mesh or 28 mesh screen. From about 30 to 70%, by weight, of the zirconia which passes the 28 mesh screen (—28 mesh material) also passes a 65 mesh screen (—65 mesh). About from 55 to 100% of the —65 mesh zirconia passes a 325 mesh screen and is present as ball mill fines having an average particle diameter of about 3 microns. Such a batch is mixed with from about 3 to 4%, by weight, of a tempering agent, which preferably, is lignin liquor, and is formed on a vibratory compacting brick press, commonly referred to as an "impact press." The shapes are burned at a temperature in the range about 2900 to 3300° F.

The stabilized zirconia material employed in the practice of the present invention is of the same type disclosed as useful in practice of the invention of United States Patent No. 3,091,914, Thomas W. Smoot and Donald F. Stock. This patent discloses various stabilizers employed for zirconia and methods and theory of stabilization thereof, and is incorporated herein by reference.

In a preferred embodiment of the invention, wherein the highest densities were obtained for impact pressed stabilized zirconia brick, all of the zirconia passed a 4 mesh screen and 50%, by weight, rested on a 10 mesh screen. About 70%, by weight, of the zirconia passing the 10 mesh screen also passed a 65 mesh screen. About 55% of the —65 mesh zirconia passed a —325 mesh screen.

The impact press employed for the work disclosed herein was of a conventional type manufactured by the Harbison-Walker Refractories Company of Pittsburgh, Pennsylvania, in which a pair of opposed press pads work a batch of material enclosed in a brickmaking cavity. This working is accomplished in the following manner: Each pad is attached to one or two pneumatic hammers. Upon actuation, these hammers caused vibration (in the neighborhood of perhaps 100 to 200 cycles per second) of the opposed pads and an enclosed batch to form a self-sustaining shape or brick. There is very little pressure, per se, exerted by the pads on the brick batch, i.e. probably less than about 100 p.s.i., most of this being the actual weight of the upper pad, pneumatic hammers and support structure.

According to preferred manufacturing techniques, vibration is maintained for about 12 to 24 seconds. The time in which a shape is impacted varies from machine to machine, depending on the size of the shape, air pressure and frequency at which the pads are vibrated, and also the physical characteristics of the batch materials. Thus, in the discussion and claims, "Impact Press" and "Impact Pressing" is meant to broadly describe a class or type of forming and to distinguish it from hydraulic and like power pressing procedures.

The tempering fluids and their nature is of importance. First of all, aqueous fluids, only, have been considered, owing to the nature of the zirconia mixture. Of the aqueous fluids employed, lignin liquor has been found best. Also important is the amount of tempering fluid. It has been found that from about 3 to 4%, by weight, of tempering fluid provides the best results.

It should be appreciated, however, that there is a wide variety of tempering fluids or agents commonly known to those skilled in refractory arts, which could be satisfactorily employed. For example, a solution or suspension of carboxymethylcellulose, alginates, starches, gums, dextrine, etc.

The following examples illustrate more clearly the teachings of the invention. They are intended as exemplary only.

A batch of stabilized zirconia was prepared and size graded. The sizing of the batch was as follows:

| Tyler screen: | Percent |
|---|---|
| —4+10 mesh | 50 |
| —28+65 mesh | 15 |
| —65 mesh | 15 |
| —325 mesh | 20 |

The average particle size of the ball mill fines (the —325 mesh material, in this case) was 2.9 microns. The batch was mixed with about 3%, by weight, of lignin liquor. The batch was placed in two different sized mold boxes. One of the mold boxes was used to produce brick measuring 9 x 4½ x 2½", which is the approximate size of the nominal "9 inch straight" brick of the refractories industry. The other mold box was used to produce brick measuring 9 x 4½ x 1¼", which is referred to as a "9 inch split." The duration of press action for the splits was approximately 12 seconds. The 9" straights were subjected to press action for approximately 24 seconds. The resulting brick were removed from the press, dried, and burned at 3140° F. for five hours.

The brick were tested for density and load test subsidence under a 25 p.s.i. load. The results indicated that the density of the brick varies between 265 and 275 p.c.f. The subsidence when subjected to a 330° F. reheat for 1½ hours was zero, and at 3700° F. for 1½ hours was 3.3%.

A number of batches of stabilized zirconia were prepared with various size gradings within the scope of the invention. Brick were prepared from these batches in the manner mentioned above, each of the brick was tested to determine its density. The variation in size grading and resulting densities are listed in the table below.

Table I

| Tyler Screen | 1 | 2 | 3 | 4 | 5 | 6 | 7 | 8 | 9 | 10 | 11 | 12 |
|---|---|---|---|---|---|---|---|---|---|---|---|---|
| −4+10 percent | 25 |  | 50 |  | 50 | 24 |  |  |  | 35 | 10 |  |
| −10+28 do | 25 | 50 |  | 50 |  | 25 | 50 | 50 | 35 |  | 25 | 35 |
| −28+65 do | 15 | 15 | 15 | 15 |  | 25 | 25 | 25 | 30 | 30 | 30 | 30 |
| −65 do | 15 | 15 |  |  |  |  |  |  | 10 |  |  | 15 |
| −325 do | 20 | 20 | 35 | 35 | 25 | 25 | 25 | 15 | 35 | 35 | 35 | 20 |
| Density, p.c.f. | 262 | 257 | 259 | 264 | 256 | 260 | 252 | 256 | 267 | 271 | 266 | 269 |

While all of the examples employed 3% of lignin liquor as a tempering fluid, it was found that 4% produced satisfactory results but that 5% was poor.

When we refer to "lignin liquor," we mean to designate that material made by concentrating the waste liquor of sulfite pulping processes to obtain a 50:50 solids to liquid weight ratio. For our invention, additional water should not be added, because it reduces density. No more than about 3 to 5% of any aqueous tempering agent should be used.

Thus, it is apparent from the foregoing that the specially size graded stabilized zirconia batches described are useful in attaining higher densities by impact pressing than by other methods, such as power pressing.

It is intended that the foregoing description be construed as illustrative and not in limitation of the invention.

We claim:

1. A method of fabricating fired refractory shapes of high density comprising, preparing a size graded refractory brickmaking batch of stabilized zirconia, all of the zirconia passing a 4 mesh screen and from 35 to 50%, by weight, resting on a 28 mesh screen, from about 30 to 70%, by weight, of the zirconia which passes said 28 mesh screen passing a 65 mesh screen, from about 55 to 100% of the material which passes a 65 mesh screen passing a 325 mesh screen, the average particle diameter of the zirconia passing the 325 mesh screen being about 3 microns, mixing said batch with about 3 to 4%, by weight based on the weight of the zirconia, of an aqueous tempering agent, subjecting said batch to impact pressing to form self-sustaining bodies, and firing said bodies at a temperature above about 2900° F. to recover bodies having a density of greater than 250 p.c.f.

2. The method of claim 1 in which the tempering agent is lignin liquor present in an amount of from about 3 to 4%, by weight.

3. A method of fabricating fired refractory shapes of high density comprising preparing a size graded refractory brickmaking batch substantially entirely of stabilized zirconia, all of the zirconia being −4 mesh screen and 50%, by weight, resting on a 28 mesh screen, 70%, by weight, of the zirconia which passes the 28 mesh screen being −65 mesh, at least about 55% of the −65 mesh zirconia being −325 mesh, the average particle diameter of the −325 mesh zirconia being about 3 microns, mixing the batch with from 3 to 4%, by weight, of lignin liquor, subjecting said batch to impact pressing to form self-sustaining bodies, and firing said bodies at a temperature above about 2900° F. to obtain burned bodies having a density of from 265 to 275 p.c.f.

4. In size graded, tempered, refractory brickmaking batches made substantially entirely from stabilized zirconia and which are used for making shapes on an impact press to obtain shapes having a density of greater than 250 p.c.f., the improvement which comprises, all of the zirconia passing a 4 mesh screen and from 35 to 50%, by weight, resting on a 28 mesh screen, from about 30 to 70%, by weight, of the zirconia which passes the 28 mesh screen also passing a 65 mesh screen, from about 55 to 100% of the material passing the −65 mesh screen also passing a 325 mesh screen, the average particle diameter of the zirconia passing the 325 mesh screen being about 3 microns.

5. In size graded, tempered, refractory brickmaking batches made substantially entirely from stabilized zirconia and which are used for making shapes on an impact press to obtain bodies having a density of from 265 to 275 p.c.f., the improvement which comprises all of the zirconia passing a 4 mesh screen and 50%, by weight, being −10 mesh, 70%, by weight, of the −10 mesh zirconia being −65 mesh, at least about 55% of the −65 mesh zirconia being −325 mesh, the average particle diameter of the −325 mesh zirconia being about 3 microns.

6. A fired refractory shape made from a tempered, size graded refractory brickmaking batch consisting essentially of stabilized zirconia in which all of the zirconia passes a 4 mesh screen and from 35 to 50%, by weight, rests on a 28 mesh screen, from about 30 to 70%, by weight, of the zirconia which passes the 28 mesh screen also passing a 65 mesh screen, about 55 to 100% of the material passing a 65 mesh screen also passing a 325 mesh screen, the average particle diameter of zirconia passing the 325 mesh screen being about 3 microns, said shape being made on an impact press and fired at a temperature above about 2900° F., and having a density of at least about 250 p.c.f.

7. The refractory brickmaking batch of claim 4 in which from 25 to 50% of the zirconia rests on a 10 mesh screen.

References Cited by the Examiner

UNITED STATES PATENTS 2,624,097  1/1953  Kistler _____ 106—57
3,175,919  3/1965  Smoot et al. _____ 106—57

TOBIAS E. LEVOW, *Primary Examiner.*

J. E. POER, *Assistant Examiner.*